(No Model.)
O. E. WILLIAMS & L. V. POOLE.
HAND BEADER.
No. 319,161. Patented June 2, 1885.
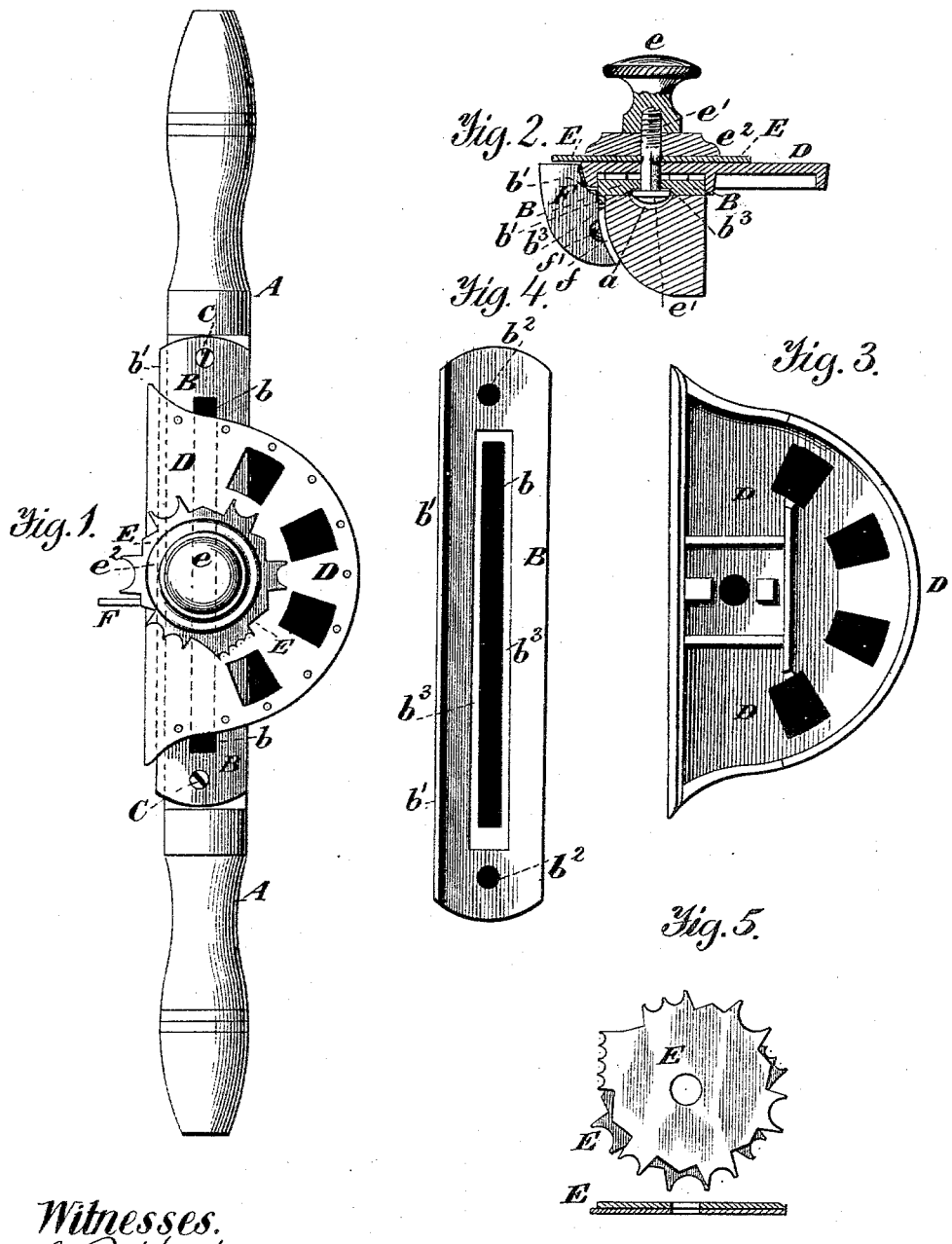
Witnesses.
A. Ruppert
Alfred T. Gage
Inventors.
Orlando E. Williams,
L. V. Poole,
Per Thomas P. Simpson
Attorney

UNITED STATES PATENT OFFICE.

ORLANDO E. WILLIAMS AND LAWRENCE V. POOLE, OF WINDSOR, VT.

HAND-BEADER.

SPECIFICATION forming part of Letters Patent No. 319,161, dated June 2, 1885.

Application filed March 28, 1885. (No model.)

*To all whom it may concern:*

Be it known that we, O. E. WILLIAMS and L. V. POOLE, of Windsor, in the county of Windsor and State of Vermont, have invented an Improved Hand-Beader, of which the following is a specification.

The special object of the invention is to make the tool and holder conveniently adjustable to either side of a stationary guide, so that it may be adapted to suit the grain of the wood and make central beadings in thick boards. This object is accomplished by constructing and combining the parts of a beader, as hereinafter described.

Figure 1 of the drawings is a plan view; Fig. 2, a central cross-section; Fig. 3, a detail view of the cutter plate or holder, and Fig. 4 a detail view of the guide-piece. Fig. 5 shows a combination of cutters.

In the drawings, A represents the two-handled stock provided with the longitudinal groove $a$; B, the cutter plate holder having the longitudinal slot $b$ to be arranged over the groove $a$. It also has a downwardly-extending flange, $b'$, to prevent lateral displacement and holes $b^2$ $b^2$ near the ends, so as to be secured to the stock by clamp-screws C C.

D is the cutter-plate, and E the cutter-disk, the latter clamped to the former by the thumb-nut $e$, headed screw $e'$, and washer $e^2$. The screw $e'$ is passed with its point up through the slot $b$, while the opposite parallel sides of its head are within the groove and rest upon the ledges $b^3$ $b^3$. Thus it will be seen that the screw is locked so that it cannot turn, but can be slid along when the nut is loosened.

F is the guide, which is provided with a right-angled arm, $f$, that is held by a screw, $f'$, to the stock A.

By loosening the nut $e$ the cutter-disk and cutter-plate may be slid so as to bring the beader-points on either side of the guide F, as may be desired.

Having thus described all that is necessary to a full understanding of our invention, what we claim as new, and desire to protect by Letters Patent, is—

A hand-beader having a stock or handle that has a longitudinal groove in its upper side, a fixed guide secured near the center of stock on the front of it, a metal plate secured to the stock on its upper side and having a longitudinal slot corresponding with the groove in the stock and fitting over it, a screw with its head resting loosely in said groove and under said plate with its shank passing up through the slot in the plate, a cutter-plate and a cutting-disk resting successively above said metal plate, each having an opening to receive the shank of the screw, and a thumb-nut engaging the end of the screw, whereby the clamps may be so adjusted as to bring the beading-points on either side of the guide, as set forth.

ORLANDO E. WILLIAMS.
LAWRENCE V. POOLE.

Witnesses:
HUGH GILCHRIST,
H. M. HUBBARD.